US011958578B2

(12) United States Patent
Van Ravens

(10) Patent No.: US 11,958,578 B2
(45) Date of Patent: Apr. 16, 2024

(54) REDUNDANT POWER SUPPLY SYSTEM

(71) Applicant: Kongsberg Maritime AS, Kongsberg (NO)

(72) Inventor: Rune Van Ravens, Slattum (NO)

(73) Assignee: Kongsberg Maritime AS, Kongsberg (NO)

( * ) Notice: Subject to any disclaimer, the term of this patent is extended or adjusted under 35 U.S.C. 154(b) by 0 days.

(21) Appl. No.: 16/970,272

(22) PCT Filed: Jan. 11, 2019

(86) PCT No.: PCT/EP2019/050635
§ 371 (c)(1),
(2) Date: Aug. 14, 2020

(87) PCT Pub. No.: WO2019/174795
PCT Pub. Date: Sep. 19, 2019

(65) Prior Publication Data
US 2021/0031887 A1 Feb. 4, 2021

(30) Foreign Application Priority Data
Mar. 16, 2018 (NO) .................................... 20180373

(51) Int. Cl.
*B63B 79/40* (2020.01)
*B60L 50/60* (2019.01)
(Continued)

(52) U.S. Cl.
CPC .............. *B63B 79/40* (2020.01); *B60L 50/60* (2019.02); *B60L 53/20* (2019.02); *B63H 11/00* (2013.01);
(Continued)

(58) Field of Classification Search
CPC ....................................................... B63B 79/40
(Continued)

(56) References Cited

U.S. PATENT DOCUMENTS 10,084,319 B2   9/2018   Lindtjorn et al.
2016/0082907 A1 3/2016   Dong et al.
(Continued)

FOREIGN PATENT DOCUMENTS

EP   2869420 A1   5/2015
EP   3035477 A1   6/2016
(Continued)

OTHER PUBLICATIONS

Despis, Enguerran; International Search Report; PCT/EP2019/050635; dated Apr. 12, 2019; 3 pages.

*Primary Examiner* — Daniel Kessie
*Assistant Examiner* — Dru M Parries
(74) *Attorney, Agent, or Firm* — Sterne, Kessler, Goldstein & Fox P.L.L.C.

(57) ABSTRACT

The present invention relates to a power supply system, especially for a floating vessel, comprising at least two segregated power sections, each constituting a main redundancy group, and each comprising at least one of a power generator adapted to generate an electrical power to a main switchboard and a power consumer, such as a propulsion unit, drawing power from said switch board, and a bus-tie connecting the main switch boards of each redundancy group. The system also comprises at least to segregated directly powered thruster redundancy groups, each including a thruster drive, each being connected to the main switch board of a corresponding one of the main redundancy groups, respectively, the thruster redundancy groups including AC/DC converter means and a DC interconnection connecting the thruster redundancy groups thus proving a loop structure, the thruster redundancy groups being able to draw power from both main switchboards.

11 Claims, 1 Drawing Sheet

(51) Int. Cl.
  *B60L 53/20*   (2019.01)
  *B63H 11/00*   (2006.01)
  *H02J 3/00*    (2006.01)
  *H02J 3/28*    (2006.01)

(52) U.S. Cl.
  CPC .............. *H02J 3/0073* (2020.01); *H02J 3/28* (2013.01); *B60L 2210/10* (2013.01); *H02J 2310/42* (2020.01)

(58) Field of Classification Search
  USPC ........................................................ 307/9.1
  See application file for complete search history.

(56)          References Cited

U.S. PATENT DOCUMENTS

2017/0133858 A1    5/2017  Pan et al.
2017/0373498 A1   12/2017  Haugan et al.
2018/0034280 A1    2/2018  Pedersen

FOREIGN PATENT DOCUMENTS

WO    WO-2015028621 A1   3/2015
WO    WO-2016062565 A1   4/2016

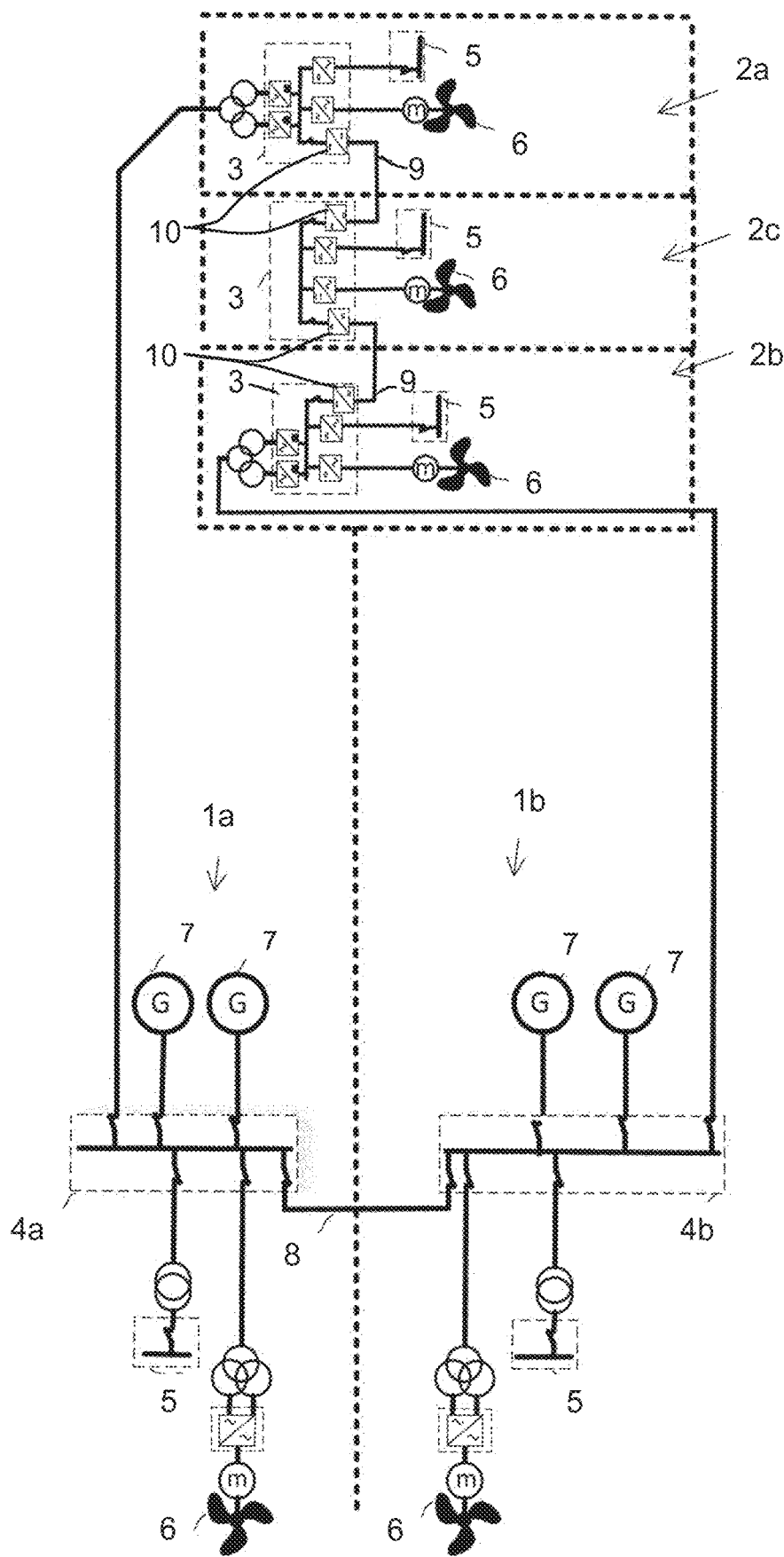

REDUNDANT POWER SUPPLY SYSTEM

The present invention relates to an electrical system and thruster drive design aimed at increasing a seagoing vessels capability and fault tolerance at reduced cost, space and weight.

A large number of vessels at sea are required to have redundancy in the design of the power and propulsion plant of the vessel. This to ensure that after the worst kind of failure the vessel is designed to withstand, there is still sufficient power and propulsion capability intact. The requirements to power and propulsion thrust after a fault will depend of the type and purpose of the vessel. Hence it may be maintaining a minimum propulsion speed/thruster, or thrust capability to maintain a fixed position.

Vessels requiring redundancy in design, e.g. dynamically positioned vessels, typically have their power and propulsion plant split in two or more redundancy groups. Each redundancy group typically have one or more engines, one or more propulsion thrusters, and power distribution to auxiliary- and general consumers for the vessel.

Simplified, a vessel with two redundancy groups may only utilize items machinery to approx. 50% to be able to compensate for a failure of the other redundancy groups. This implies suboptimal operation of the machinery, and further requires much more installed power of machinery than what can be utilized—both engines and thruster.

The alternative is to split into additional redundancy groups to limit the required reserve capacity of machinery. This again may be costly, in particular for vessels which redundancy is also to withstand fire and flooding. The challenge in particular related to additional rooms, segregation for fire and flooding protection of utility systems, and segregation of cables (trunks), piping, ducts and so forth.

At the present vessels having redundancy in design, typically have the power and propulsion plant split in two or more redundancy groups. Each redundancy group traditionally have one or more engines as main power sources and one or more propulsion units.

As consequence, in case of worst case failure, the vessel would loose all propulsion units and engines of the failing redundancy group. So typically, the required propulsion and positioning capability of the vessel is ensured by increasing the quantity and/or rating of the propulsion units, or by adding redundancy groups with additional engines and complexity of the vessel. This leads to increased cost, space and weight of the power and propulsion plant and the overall vessel. As for operation of the vessel, the machinery cannot be optimally utilized which leads to higher fuel and emissions as well as increased maintenance.

A number of different solutions are discussed in WO2016/062565. The proposed solution in WO2016/062565 is based on a loop structure where the two independently powered switchboards are connected to two or more indirectly powered main switchboards connected in a series between the directly powered switchboards. While the object of the WO2016/062565 application is to reduce the size, weight and cost of the structures while maintaining sufficient power supply in the redundant systems, the structure is complex. U.S. Ser. No. 10/084,319 describes a DC power system with two redundancy groups powered by generators with a common energy storage. In US2017/0133858 is described including two segregated power sections, each constituting a main redundancy group and each comprising a power generator supplying power to a power consumer through a switch board, and where the consumers are connected through a DC interconnection to provide a loop structure so that they can draw power from both switch boards.

The object of the present invention is to further reduce the size and cost of the electrical and power system on a vessel while maintaining redundancy in the system and thus limit the effect of power failures in the system. This is obtained as described in the accompanying claims.

The solution utilizes autonomous, redundantly powered thruster drives which are interconnected to form a loop configuration. Each drive has a DC link to one or more of the neighboring thruster drive in the loop. Thruster drives which are not have a direct power supply from a main (AC) switchboard have dedicated inverters to feed all auxiliaries related to the thruster units and may be referred to as a thruster redundancy group. The DC link feeders of the thruster drive are protected by converter, fuse and switch. This to ensure a fault on one drive or a complete redundancy group does not propagate to any other redundancy group.

Each loop will have minimum two thruster drives between two Main/AC Switchboards (medium or low voltage). A vessel may have more than one loop, e.g. one for all forward thrusters and one for all aft thrusters.

The invention will be described more in detail below, with reference to the accompanying drawings illustrating the invention by way of examples.

FIG. 1 illustrates a first embodiment of the invention.

In FIG. 1 the solution according to the invention is exemplified by a single loop to one remote section of the vessel. The drawing shows two main redundancy groups 1a,b each illustrated with generators 7 coupled to two main switch boards 4a,b and optional thrusters 6 and switchgear 5 for feeding auxiliaries in a the corresponding redundancy groups, the main switch boards 4a,b being connected to each other through a bustie 8.

The main switch boards 4a of each main redundancy groups are each connected to a thruster redundancy group 2a through cable and a transformer and AC/DC converter to an interconnected autonomous thruster drive 3 including thrusters 6 and auxiliaries 5. The thruster drive 3 also may include a DC/DC-converter type breaker for control and/or protection of a DC-link 9 to an adjacent thruster redundancy group. This way the thruster redundancy groups are connected through a DC interconnection, and the number of redundancy groups are preferably three or more coupled in a series in the DC section of the system.

The loop thus contains two directly powered thruster redundancy groups 2a,2b, and one indirectly powered redundancy group 2c positioned between the two directly powered redundancy groups, thus being powered via the DC link of the two directly power thrusters 2a,2b. The dotted lines representing the segregation line between redundancy groups. According to a preferred embodiment of the invention the indirectly powered redundancy groups is constituted by an indirectly powered thruster redundancy group, but may alternatively or in addition include an energy storage redundancy group.

The system thus defines a loop where, starting from one of the main redundancy groups 1, the first main redundancy group switch board 4a is connected through an AC connection to a first of said directly powered redundancy groups 2a, the directly powered redundancy group including an AC/DC-converter, then through a DC connection to an indirectly powered redundancy group 2c. The indirectly powered redundancy group 2c is also connected through a DC connection to a second directly powered redundancy group 2b, which in turn is connected through an AC connection to a second main redundancy group switch board 4b.

The first and second main switchboards 4a,4b are connected through the bustie 8, closing the loop.

The linked autonomous thruster drives are interconnected by fault tolerant connections. Hence a fault in a thruster redundancy group would not propagate to any other redundancy group. The first, directly powered, thruster redundancy group of the loop, connected by cable from a Main Switchboard, may be designed with failsafe protection to ensure that faults cannot propagate between a Main Redundancy Group and a Thruster redundancy group. This is achieved by installing appropriate protection and ensuring full redundancy in design. The level of redundancy of the protection and testing will vary with classification society rules as is discussed in the WO2016/062565 publication for DP3 Closed Ring protection scheme.

The new solution may also be utilized when the bustie breakers of the main switchboards are open. Hence the loop is powered by two main redundancy groups (from two Main Switchboards) which are electrical segregated. Since the new solution links the DC level of the thruster drives, the link can be powered from Main Switchgears operating with different frequency and voltage.

The invention is designed so that power allocation may be integrated with the Maneuvering Control or Dynamic Positioning system, e.g. as described in WO2015/028621. By integration with a Maneuvering Control or Dynamic Positioning system, the power required by the thrusters in each loop, may be controlled by an Energy Management System to draw power dis-proportionally from the respective Main Switchboards 4a,b. The Energy Management System measures the loading (utilization) of the engines of each main redundancy group in addition to their respective load ramps (power increase). The EMS will allocate power from the respective redundancy groups by control to optimize:

- compensating for uneven and unfavorable utilization levels (controlling against the Specific Fuel Oil Consumption of the respective engines)
- compensating for uneven and unfavorably high-power fluctuations These control function are measured against, and aimed to prevent, trigger level which would automatically start up additional engines. This since, additional engines would reduce the average utilization level of the engines away from optimal operation range. Hence increasing fuel costs and emissions in addition to increasing running hours and maintenance costs. For dynamically positioned (DP) vessels, the EMS will interface the DP system for the DP Consequence Analysis to calculate optimal allocation. This may increase the uptime of the vessel and/or reduce the required number of engines online.

The new solution may typically have the main sources of power 7 connected to the main switchboards 4a,b.

Several variations may be included in the system according to the invention:

Power sources 7. The main sources of power are typically connected to the main switchboards and may be combustion engines, fuel cells or electrical energy storage (batteries). However, power sources in the form of energy storage units may be connected to the thruster drives. Connection point may be DC link or AC aux. switchboard.

Power supply cables. Power supply to two or more thrusters in a DC link. Hence, cables and transformers feeding power to the thrusters power, mat be one for each or a lower number.

Power link 9 between the directly and indirectly powered redundancy groups are preferably DC breakers and DC cables between thrusters and/or direct DC busbars, or through a dedicated winding on the thruster transformer with AC cables in-between.

DC breakers/switches 10 may be any DC/DC converters in series with fuse and/or switches (e.g. no-load switch), intelligent converter type switch (typical to limit transfer of short circuit contribution), or conventional mechanical circuit breakers (typically in parallel with resonance circuit to achieve zero crossing and arc quenching).

Auxiliaries for thrusters may be fed from a transformer's 4th winding or from an inverter on the DC link of each thruster drive (or possible combinations).

AC/DC converter for thruster drive—may be diode rectifier (mono-directional like diode) or active front end type (bi-directional).

The main advantage of the new solution is simply the segregation of redundancy groups, in particular for thrusters in remote sections of the vessel. Hence, with limited cost, space and complexity for such segregation, it is possible to reduce the both the required installed and the required operating machinery.

This optimization and savings in machinery is achieved without adding additional main redundancy groups, hence minimizing added complexity in arrangement and segregation (cabling, piping, ducting, insulation etc.). The simplest segregation (e.g. two redundancy groups in port and starboard) can be utilized throughout the vessel, while only the remote sections of the vessel (e.g. far forward and/or aft) would have additional redundancy groups for thrusters.

Reducing machinery units with their auxiliary systems is not only reducing cost of the vessel and equipment and systems to be maintained but provides significant reductions in space and weight.

Additional benefits of the invention for use when operating with open busties between Main Switchboards (electrically segregated):

The solution may further improve the robustness of the power plant. This new solution may compensate possible uneven load distribution of the main redundancy group also when the busties between main switchboards are open. Hence, enabling load leveling or even transfer of power from one group to another without closing the busties of the main switchboards. Closing the busties of the main switchboards during e.g. DP operations may be prohibited by vessel charterer, and may anyhow imply strict requirements from classification society to the system and testing. This in particular to DP vessels of IMO equipment class 3. By integration with a Maneuvering Control or Dynamic Positioning system, the power required by the thrusters in each loop, may be dis-proportionally allocated and drawn from the respective the Main Switchboards. Consequently, disadvantages from uneven load distribution between main redundancy groups may be compensated. EMS control functions are measured against, and aimed to prevent, trigger level which would automatically start up additional engines. This since, additional engines would reduce the average utilization level of the engines away from optimal operation range. Hence increasing fuel costs and emissions in addition to increasing running hours and maintenance costs.

To summarize the invention relates to a power supply system, especially for a floating vessel, comprising at least two segregated power sections 1a,1b. Each power section constitutes a main redundancy group, each comprising at least one of a power generator 7 adapted to generate an electrical power to a main switch board 4a,4b and/or a power consumer 5,6, such as a propulsion unit 6 or other equipment 5 on board, drawing power from said switch boards 4a,4b, The main switchboards of each main redundancy group are connected through a bustie 8.

The system also comprising at least two segregated directly powered thruster redundancy groups 2a,2b, each including a thruster drive 6 or other consumers 5, and being connected to the main switch board 4a,4b of a corresponding main redundancy groups 1a,1b, the directly powered redundancy groups being connected to different main redundancy groups preferably through an AC connection. The directly powered thruster redundancy groups 2a,2b includes AC/DC and thruster drives 3 with converter means and a local switchboard, as well as a DC interconnection 9,10 connecting the directly powered thruster redundancy groups. Preferably at least one indirectly powered thruster redundancy group 2c is connected between the directly powered thruster redundancy groups 2a,2b. As the main redundancy groups are connected through a main bustie 8 and the thruster redundancy groups are connected through a DC connection the system constitutes a loop structure where the thruster redundancy groups being able to draw power from both main switchboards.

The DC interconnection between the thruster redundancy groups also includes a DC/DC-converter type breaker adapted to control and/or protection of the DC link.

The system may also have a power management system adapted to control and allocate from the main switchboards respectively. Preferably the power management system includes input means for receiving information related to the power consumption of each of the redundancy groups 2a,b,c and to allocate power from the main redundancy groups 1 based on their power consumption. The power management system may thus be adapted to balance the power consumption of the main redundancy groups even when the busties are open.

The system may also include energy storage systems such as batteries connected to the DC connection directly or through inverters on the auxiliary switchboards in the redundancy groups. This may also be controlled by the power management system and may provide an additional power backup in the groups.

As illustrated in the drawings the thruster redundancy groups include also auxiliary equipment 5 connected to the redundancy group DC link directly or through an inverter on the DC link connection. This way none of the thrusters or auxiliaries in the thruster redundancy groups are lost at a loss of power in a main redundancy group.

The invention claimed is:

1. A power supply system comprising:
   at least two segregated power sections, each of the at least two segregated power sections comprising:
     a main redundancy group comprising: a main switch board; and
     at least one of:
       a power generator adapted to generate electrical power to the main switch board; and
       a power consumer drawing power from the main switch board;
   a bus-tie connecting the main switch boards of the main redundancy groups;
   at least two segregated directly powered thruster redundancy groups, each of the at least two segregated directly powered thruster redundancy groups being connected to and receiving AC power from one of the main switch boards through an AC interconnection;
   wherein each of the at least two segregated directly powered thruster redundancy groups comprises:
     a thruster drive connected to the main switch board of a corresponding one of the main redundancy groups, wherein the thruster drive comprises a DC/DC type breaker; and
     an AC/DC converter;
   wherein a number of AC interconnections to the main switch boards corresponds to a number of the at least two segregated directly powered thruster redundancy groups;
   an indirectly powered thruster redundancy group comprising a thruster drive and a thruster, and connected via a pair of DC interconnections to two of the at least two segregated directly powered thruster redundancy groups;
   wherein each of the pair of DC interconnections terminates at one of the at least two segregated directly powered redundancy groups and comprises a DC/DC type breaker for at least one of control and protection of the respective one of the pair of DC interconnections; and
   wherein the indirectly powered thruster redundancy group is powered only through at least one DC interconnection of the pair of DC interconnections from at least one of the two of the at least two segregated directly powered thruster redundancy groups.

2. The power supply system according to claim 1, wherein each of the pair of DC interconnections comprises a DC/DC-converter type breaker adapted to at least one of control and protection of the respective one of the pair of DC interconnections.

3. The power supply system according to claim 1, further comprising a power management system adapted to control and allocate power from the main switchboards respectively.

4. The power supply system according to claim 3, wherein the power management system is configured to receive information related to power consumption of the indirectly powered thruster redundancy group and the at least two segregated directly powered thruster redundancy groups and is configured to allocate power from the main redundancy groups based on the power consumption.

5. The power supply system according to claim 3, wherein the power management system is further configured to balance power consumption of the main redundancy groups.

6. The power supply system according to claim 1, wherein at least one of the thruster redundancy groups comprises an auxiliary equipment connected to the respective one of the thruster redundancy group through an inverter on the respective one of the pair of DC interconnections.

7. The power supply system according to claim 1, further comprising an energy storage system connected to the respective one of the pair of DC interconnections.

8. The power supply system according to claim 7, wherein the energy storage system is connected through an auxiliary switch board.

9. The power supply system according to claim 1, wherein the indirectly powered thruster redundancy group comprises an energy storage.

10. A power supply system comprising:
    at least two segregated power sections, each of the at least two segregated power sections comprising:
      a main redundancy group comprising: a main switch board; and
      at least one of:
        a power generator adapted to generate electrical power to the main switch board; and
        a power consumer drawing power from the main switch board;

a bus-tie connecting the main switch boards of the main redundancy groups;
at least two segregated directly powered thruster redundancy groups, each of the at least two segregated directly powered thruster redundancy groups being connected to and receiving AC power from one of the main switch boards through an AC interconnection;
wherein each of the at least two segregated directly powered thruster redundancy groups comprises:
  a thruster drive connected to the main switch board of a corresponding one of the main redundancy groups, wherein the thruster drive comprises a DC/DC type breaker; and
  an AC/DC converter;
wherein a number of AC interconnections to the main switch boards corresponds to a number of the at least two segregated directly powered thruster redundancy groups;
an indirectly powered thruster redundancy group comprising a thruster drive and a thruster, and connected via a pair of DC interconnections to two of the at least two segregated directly powered thruster redundancy groups;
wherein each of the pair of DC interconnections terminates at one of the at least two segregated directly powered redundancy groups and comprises a DC/DC type breaker for at least one of control and protection of the respective one of the pair of DC interconnections;
wherein the indirectly powered thruster redundancy group is powered only through at least one DC interconnection of the pair of DC interconnections from at least one of the at least two segregated directly powered thruster redundancy groups;
a power management system adapted to control and allocate power from the main switch boards respectively to the at least two segregated directly powered thruster redundancy groups and the indirectly powered thruster redundancy group; and
wherein the power management system receives information related to power consumption of the indirectly powered thruster redundancy group and the at least two segregated directly powered thruster redundancy groups and to allocate power from the main redundancy groups based on the power consumption.

11. A power supply system comprising:
a first segregated power section comprising a first main switch board and at least one of a first power generator configured to generate electrical power to the first main switch board and a first power consumer drawing power from the first main switch board;
a second segregated power section comprising a second main switch board and at least one of a second power generator configured to generate electrical power to the second main switch board and a second power consumer drawing power from the second main switch board;
a bus-tie connecting the first main switch board and the second main switch board;
a first segregated directly powered thruster redundancy group coupled to and receiving AC power from the first main switch board through a first AC interconnection, wherein the first segregated directly powered thruster redundancy group comprises a first thruster drive connected to the first main switch board, a first AC/DC converter, and a first DC/DC type breaker;
a second segregated directly powered thruster redundancy group coupled to and receiving AC power from the second main switch board through a second AC interconnection, wherein the second segregated directly powered thruster redundancy group comprises a second thruster drive connected to the second main switch board, a second AC/DC converter, and a second DC/DC type breaker;
an indirectly powered thruster redundancy group comprising a thruster drive, a thruster, and an energy storage,
wherein the indirectly powered thruster redundancy group is connected via a first DC interconnection to the first segregated directly powered thruster redundancy group and comprises a third DC/DC type breaker for at least one of control and protection of the first DC interconnection,
wherein the indirectly powered thruster redundancy group is connected via a second DC interconnection to the second segregated directly powered thruster redundancy group and comprises a fourth DC/DC type breaker for at least one of control and protection of the second DC interconnection, and
wherein the indirectly powered thruster redundancy group is powered only through at least one DC interconnection of the first and second DC interconnections from at least one of the first and second segregated directly powered thruster redundancy groups.

* * * * *